Patented May 4, 1926.

1,582,912

UNITED STATES PATENT OFFICE.

CARLETON ELLIS, OF MONTCLAIR, NEW JERSEY, ASSIGNOR, BY MESNE ASSIGNMENTS, TO SETH B. HUNT, TRUSTEE, OF MOUNT KISCO, NEW YORK.

ALCOHOLIC PREPARTION FOR TOPICAL USE.

No Drawing.   Application filed May 22, 1919. Serial No. 298,843.

*To all whom it may concern:*

Be it known that I, CARLETON ELLIS, a citizen of the United States, and a resident of Montclair, in the county of Essex and State of New Jersey, have invented certain new and useful Improvements in Alcoholic Preparation for Topical Use, of which the following is a specification.

This invention relates to a method of treating propyl alcohol and to certain products obtained therefrom, more specifically products intended for application to the skin or clothing of persons and consisting of alcoholic preparations comprising propyl alcohol and more specifically isopropyl alcohol of a purified character preferably in conjunction with an essential oil or medicinal agent.

The present invention is concerned with alcohol particularly isopropyl alcohol derived from propylene. The latter may be obtained by cracking petroleum oils and the like of a suitable character breaking down any hydrocarbon to yield propylene. The latter may be associated with other olefines such as butylene, amylene and the like. The gases containing propylene may be passed into cold sulphuric acid of a strength say 1.8 specific gravity and absorption allowed to take place with the production of what may be termed an acid extract containing propyl sulphuric acid. This may be hydrolyzed to produce an alcoholic mixture from which crude propyl alcohol is obtained by distillation. This is accompanied by hydrocarbons or other substances which impart a strong odor of a disagreeable character from the standpoint of alcoholic preparations intended for medical or pharmaceutical purposes. In order to prepare the propyl alcohol in a form suitable for such applications I preferably treat the crude alcohol in the following manner. 5 to 10% of caustic soda is added and the alcohol heated to boiling or in any event warmed somewhat. When heated to boiling a reflux condenser may be employed, the alcohol is then saturated with common salt and allowed to stand. Globules of oily material will separate from the impure product and when the amount of this oil is considerable it may be drawn off. However, there are still traces of oil in the alcohol and these may be removed by filtration through sawdust, charcoal, kieselguhr and the like, especially material of this character which has been treated with oil. For example bone black is allowed to take up say 10 to 20% of its weight of a pure oil such, for example, as refined mineral oil used for medicinal purposes, white Russian oil and the like, and fatty oils and waxes may be employed in some cases. On agitation of the dilute alcohol with this oil material or preferably by filtration through the oil material the residual oily matter in the alcohol is absorbed in the oil filtration agent. A further purification may be effected by the addition of a few per cent of hydrogen peroxide and shaking with a small amount of platinum or palladium catalyzer supported on asbestos or kieselguhr. The alcohol then may be concentrated and rectified by re-distillation which may be repeated if desired. The alcohol, when purified in the manner described or in an equivalent way, is in substantially pure form and practically free from odors of foreign materials.

This alcohol may be employed in the manufacture of witch hazel extract and other extracts intended for external application, by for example distilling witch hazel with the alcohol in the presence of steam. Or the purified isopropyl alcohol may be added to ordinary witch hazel extract containing ethyl alcohol, such additions being in amount of 5 to 20% or more as may be desired.

It has commonly been supposed that propyl alcohol was more toxic than ethyl alcohol and this may be true to some extent in the case of primary propyl alcohol, but observations made with the secondary or isopropyl alcohol indicate that it is not irritating or harmful to the skin. Hence the purified isopropyl alcohol may be employed as a rubbing alcohol in place of ordinary grain alcohol. As stated it is important that alcohol used for such purposes should be free from empyreumatic oils and the like as these, even in small quantities, may have an irritating action on the skin.

The isopropyl alcohol may also be employed advantageously in perfumes and may be mixed and blended with various essential oils and perfuming principles. The isopropyl alcohol will dissolve and incorporate readily with perfuming oils including the cruder oils such as oil of lavender, various mint oils and the like and will also dissolve the more costly perfuming agents such as the various flower oils. Furthermore the refined propyl alcohol, especially if not containing more than about 5% of water and if free from empyreumatic oils appears to have no deleterious effect on essential oils of this character. The amount of isopropyl alcohol which may be used in such perfumes may vary within considerable limits from say 5 or 10% up to 90 or 95%. It may be used in admixture with ethyl alcohol if desired, in the place of isopropyl alcohol. As noted above, the presence of large amounts of water is undesirable when using the alcohol with certain perfuming principles and it is especially desirable not to have a large amount of isopropyl hydrate present. The hydrate of isopropyl alcohol exists in several forms, all of which are undesirable, in any large proportion, for certain purposes. Hence the alcohol should be freed from such hydrates to as great an extent as possible when the presence of these hydrates is objectionable.

The isopropyl alcohol prepared herein may be employed as a carrier for various synthetic perfuming agents and it also may be employed in the preparation of hair tonics.

What I claim is:—

1. In products intended for application to the skin or clothing, an alcoholic preparation comprising purified isopropyl alcohol derived from propylene, and free from empyreumatic oils.

2. In products intended for application to the skin or clothing, an alcoholic preparation comprising a perfume oil incorporated with purified isopropyl alcohol derived from propylene.

3. A perfume applicable to the skin or to clothing containing a perfume oil dissolved in isopropyl alcohol.

4. In products intended for application to the skin or to clothing, an alcoholic preparation comprising a perfume oil incorporated with a purified and deodorized isopropyl alcohol containing no more than five percent of water and free from empyreumatic oil and also substantially free from alcoholic hydrates.

CARLETON ELLIS.